US012733773B2

(12) United States Patent
Brisbois et al.

(10) Patent No.: US 12,733,773 B2
(45) Date of Patent: Sep. 15, 2026

(54) HEAT RESISTANT SHELF EXTENSION FOR GAS GRIDDLE/GRILL

(71) Applicant: Construction Protection System, LLC, Castle Pines, CO (US)

(72) Inventors: Michael B Brisbois, Castle Pines, CO (US); Richard A Brisbois, Plano, TX (US); Dawson F Swan, Loveland, CO (US); Christopher F Meduna, Loveland, CO (US)

(73) Assignee: Construction Protection Systems, LLC, Castle Pines, CO (US)

( * ) Notice: Subject to any disclaimer, the term of this patent is extended or adjusted under 35 U.S.C. 154(b) by 0 days.

(21) Appl. No.: 19/407,710

(22) Filed: Dec. 3, 2025

(65) Prior Publication Data

US 2026/0182778 A1 Jul. 2, 2026

Related U.S. Application Data

(60) Provisional application No. 63/740,507, filed on Dec. 31, 2024.

(51) Int. Cl.
*A47J 37/07* (2006.01)

(52) U.S. Cl.
CPC .................................. *A47J 37/0786* (2013.01)

(58) Field of Classification Search
CPC .................................................... A47J 37/0786
USPC .......... 248/223.41, 224.51, 224.61; 211/135; 126/25 R
See application file for complete search history.

(56) References Cited

U.S. PATENT DOCUMENTS 5,104,080 A * 4/1992 Berger ................ A47J 37/0786 211/90.01
2006/0075670 A1 * 4/2006 Brinkman .............. G09F 3/204 40/666

* cited by examiner

*Primary Examiner* — Vivek K Shirsat
(74) *Attorney, Agent, or Firm* — Leyendecker & Lemire LLC

(57) ABSTRACT

A shelf extension assembly configured to be placed over and secured to the metal shelf of a propane/gas griddle or grill is described. The shelf extension assembly comprises a clip assembly that is attached to the metal shelf of the griddle and facilitates the attachment and removal of an extended shelf that covers and rests on the underlying metal shelf. The extended shelf is fabricated of materials that are heat resistant and have a relatively low thermo-conductivity allowing it to remain significantly cooler than the metal shelf.

19 Claims, 6 Drawing Sheets

HEAT RESISTANT SHELF EXTENSION FOR GAS GRIDDLE/GRILL

RELATED REFERENCES

This application claims the benefit of and incorporates by reference U.S. provisional patent application 63/740,507 entitled "Heat Resistant Shelf Extender for Gas Griddle and Grill" filed on Dec. 31, 2024 and having two common inventors with the present application.

BACKGROUND

A significant problem was outdoor gas fired griddles, such as the Blackstone™ griddle (and griddles of a similar design) 200 illustrated in FIGS. 1-2, is the thermo-energy from the griddle platen 205 is conductively and radiantly transferred to surrounding surfaces such as, but not limited to, the metal shelves 210 typically provided on the left and right sides of the griddle. As can be seen, the usable portion of the metal shelf is spaced away from the edge of the griddle body 215 forming an opening 225 between the griddle body and the inside edge of the usable portion of the shelf. This helps reduce heat being conducted from the griddle platen and the griddle body to the shelf. The edges of the opening comprise upturned flanges 230 that help hinder a user from inadvertently sliding a plate, tray or bowl up against the extremely hot body of the griddle. Nevertheless, a substantial amount of heat is transferred from the griddle platen to the body 215 of the griddle and then through the two attachment locations 220 of the metal shelf to the body.

When the griddle 200 is at cooking temperature and has fully warmed up, the temperatures of the metal shelves 210 can easily reach or even exceed 125 degrees F. This often makes using the shelf to hold food preparation items impractical, and presents the possibility that a user, who comes in contact with the shelf, could be burned. Simply put, the side metal shelves on a gas griddle are not very useful except for perhaps placing metal cookware and utensils thereon. Additionally, the metal shelves tend to be rather small providing little surface area to facilitate holding any more than a single plate, bowl or frying pan. Even if the temperature were not elevated to unacceptable levels, the shelf's size, typically around 17"×12", does not permit practical use as a food preparation or food storage locations.

OVERVIEW

Figure 1:
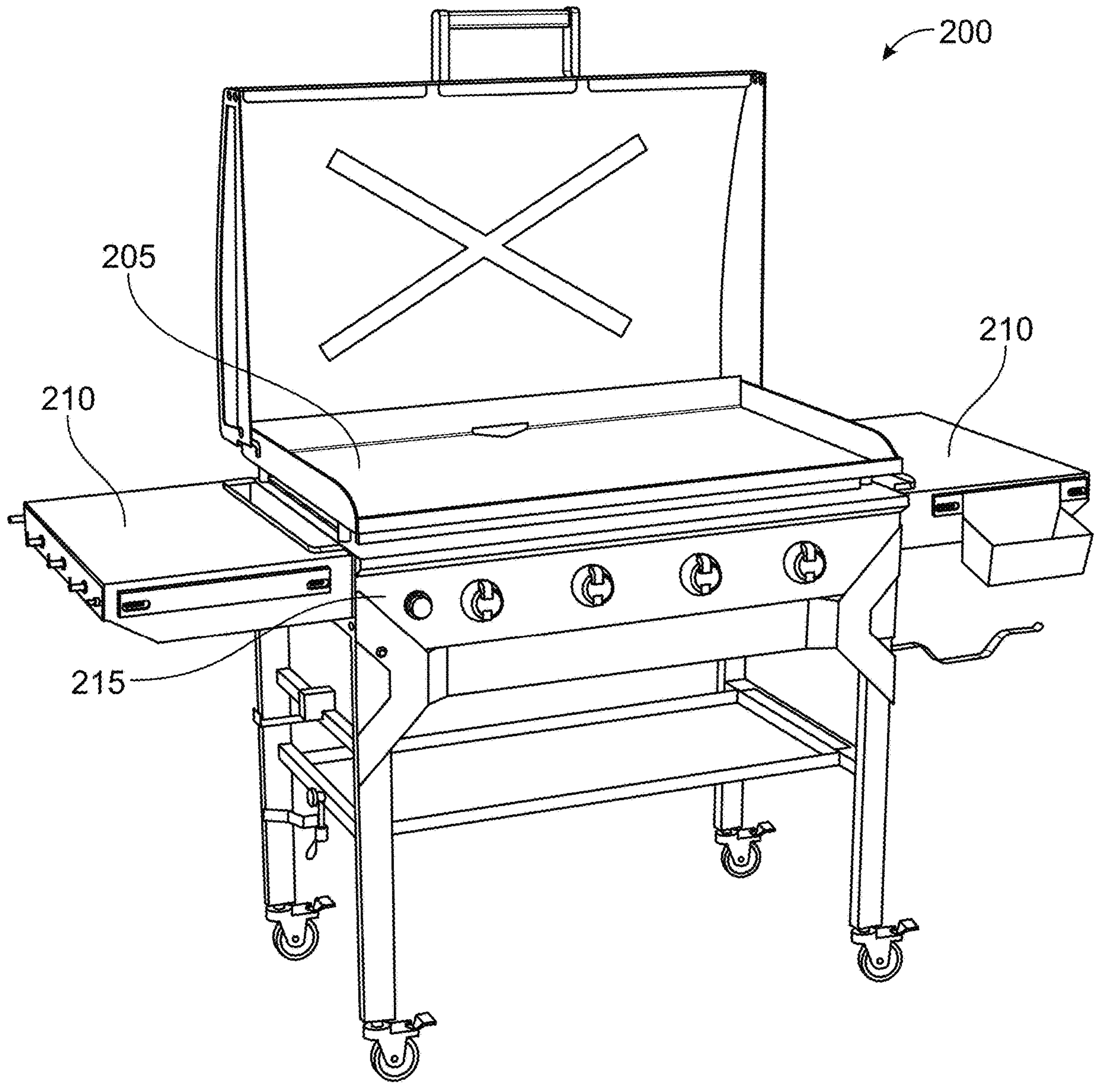
FIG. 1 is an illustration of a typical propane/gas griddle as is known in the art.
Figure 2:
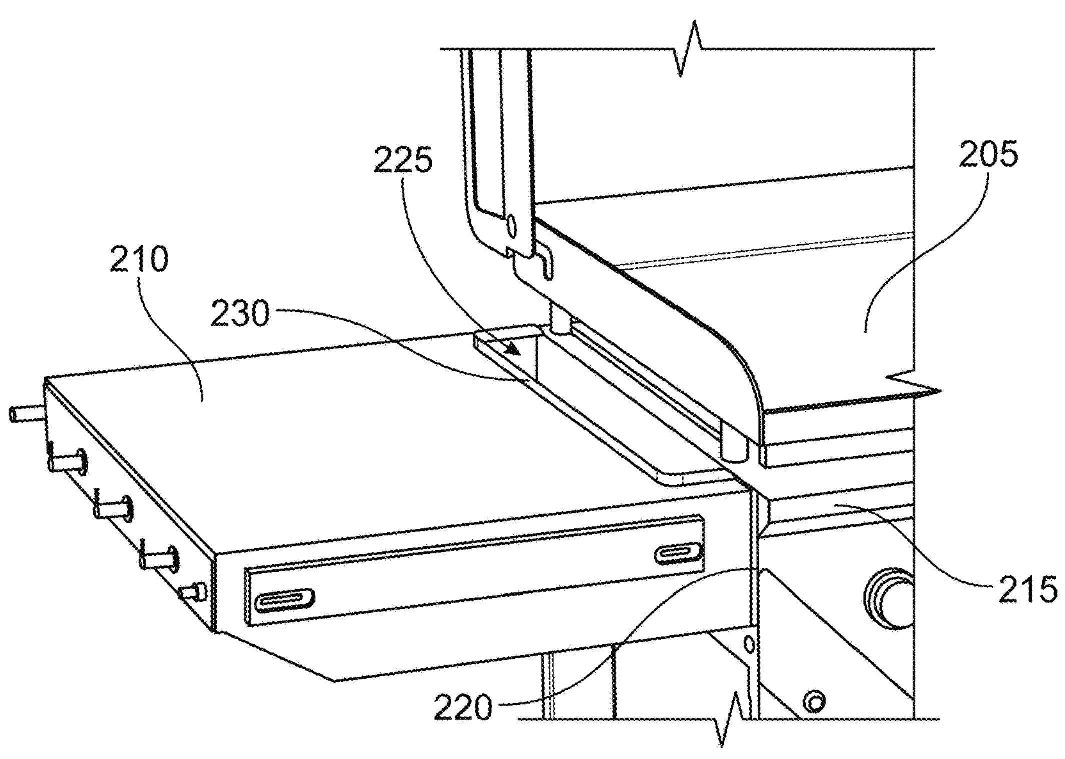
FIG. 2 is a close-up view of the griddle of FIG. 1 illustrating the griddle's metal shelf and its connection to the body of the griddle as is known in the art.

Embodiments of the present invention comprise a shelf extension assembly to be placed over and secured to the underlying typically metal shelf of a propane/gas griddle or grill, such as can be found on griddles marketed and sold by Blackstone Products of Logan, UT. The shelf extension assembly described and illustrated herein comprises a clip assembly that is attached to the metal shelf of the griddle and facilitates the attachment and removal of an extended shelf that covers and rests on the underlying metal shelf. The extended shelf is configured for easy attachment and removal from the underlying metal shelf and can further serve as a tray for moving food to and from the griddle. Importantly, the shelf-extender increases the work surface when compared to the stock shelfing substantially: In one embodiment, the surface is about 100% larger. Further, the shelf is fabricated of materials that are heat resistant and have a relatively low thermo-conductivity allowing it to remain significantly cooler than the stock metal shelf. The shelf and its quick connect fastening system are stout enough to handle the weight of whatever might reasonably be placed anywhere on the extended shelf.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive, rather the term is inclusive meaning "either or both."

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front, lateral, inwardly, outwardly, and upwardly are relative to each other and are dependent on the specific orientation of an applicable element or article, and are used accordingly to aid in the description of the various embodiments and are not necessarily intended to be construed as limiting.

Unless otherwise indicated or dictated by context, the terms "approximately" and "about" mean±20%. Unless otherwise indicated or dictated by context, the term "substantially" means±10%. The term "generally" means for the most part.

Embodiments a Heat-Resistant Shelf Extension Assembly

An embodiment of the shelf extension assembly 100 is described herein with reference to FIGS. 3-10. The illustrated embodiment comprises (i) an extended shelf/server platter 110 that is comprised of a material or materials that resist damage from heat and have a relatively low thermal conductivity, and (ii) a clip assembly 105 configured to permit quick removal and attachment of the extended shelf wherein the clip assembly conveniently remains in place on the metal shelf even when the extended shelf has been removed therefrom. Because the clip assembly is typically left in place, it does not have to be installed, touched or adjusted when it and/or the metal shelf 210 are hot during griddle 205 use.

Figure 3:
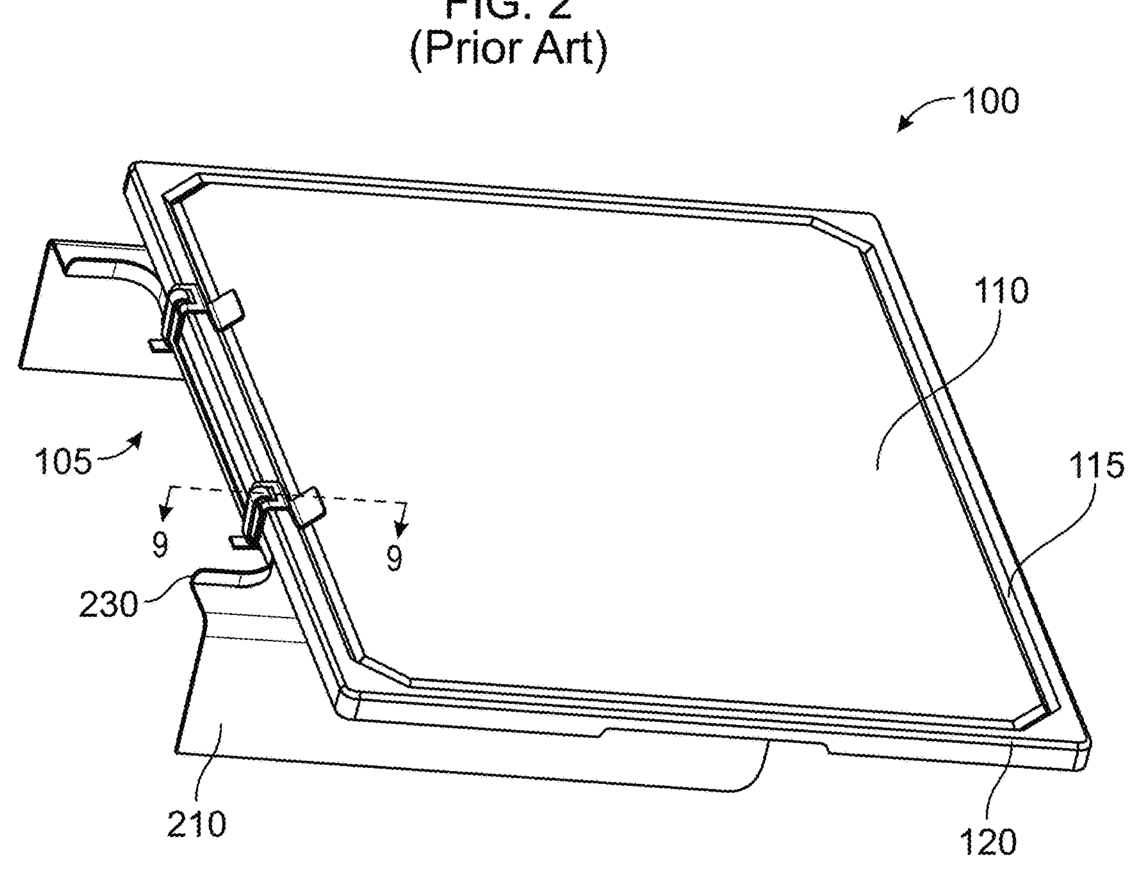
FIG. 3 is a perspective view showing the shelf extension assembly attached to a metal shelf of a griddle according to an embodiment of the present invention.
Figure 4:
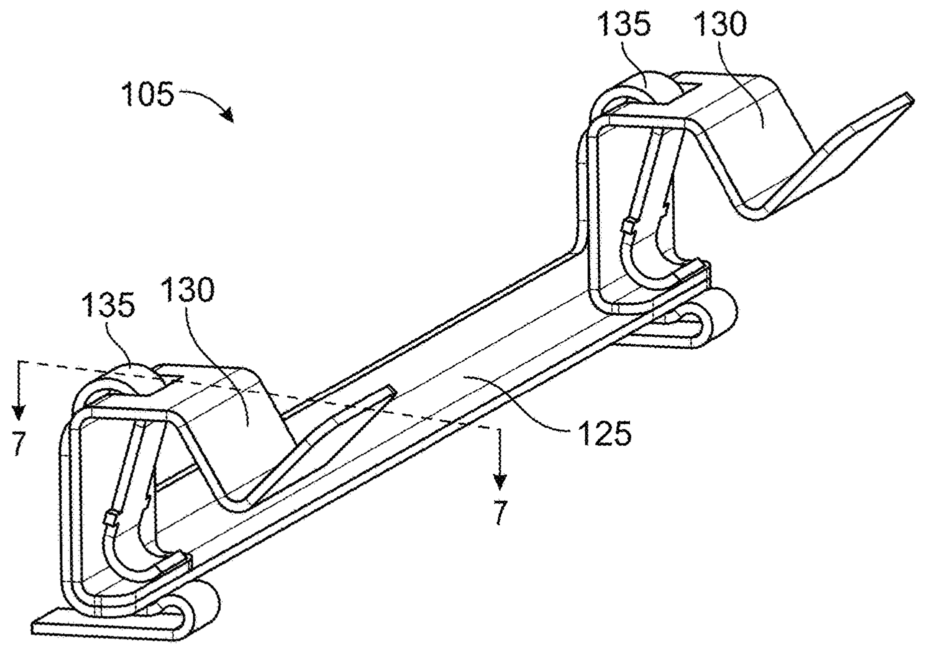
FIG. 4 is a perspective front view of the clamp assembly according to an embodiment of the present invention.
Figure 5:
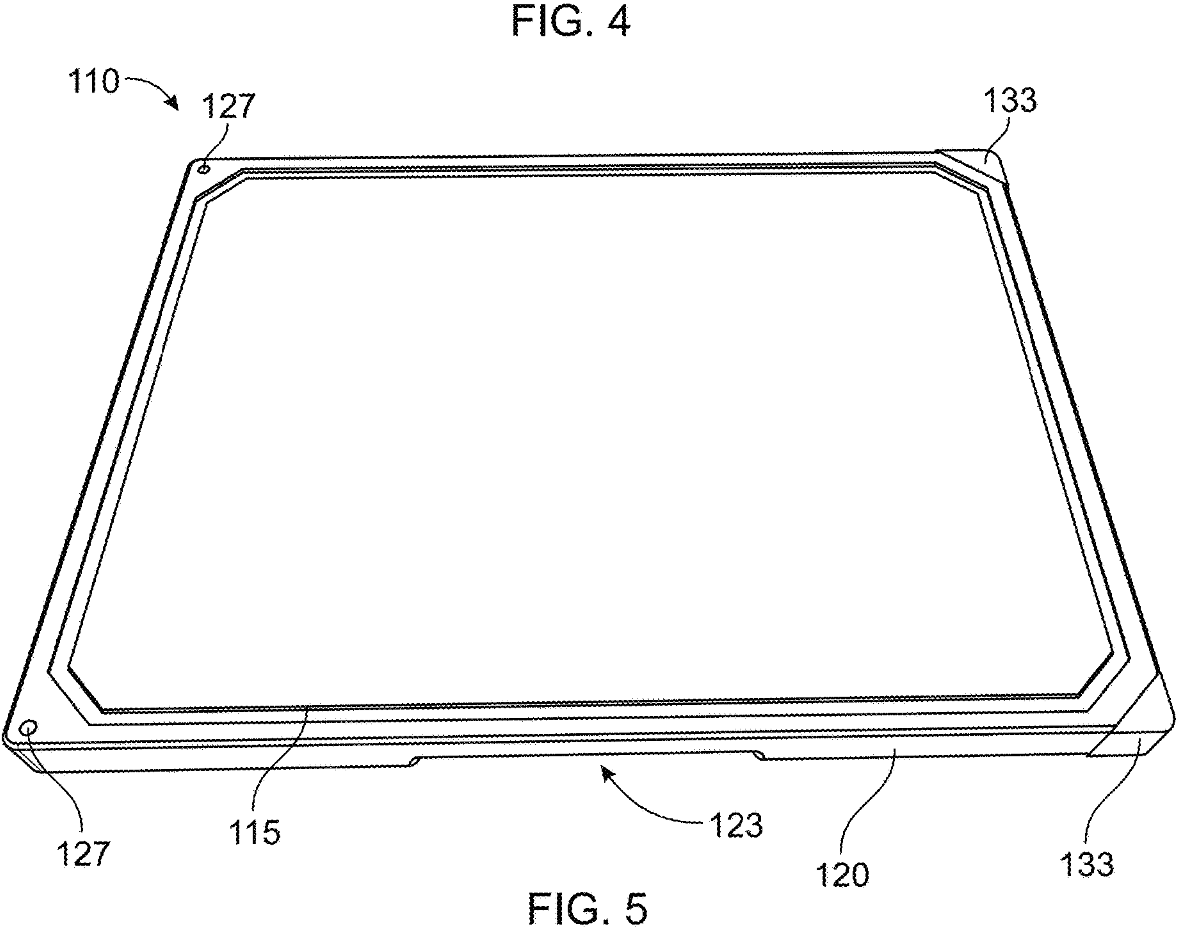
FIG. 5 is a perspective top view of a bamboo extended shelf according to an embodiment of the present invention.
Figure 6:
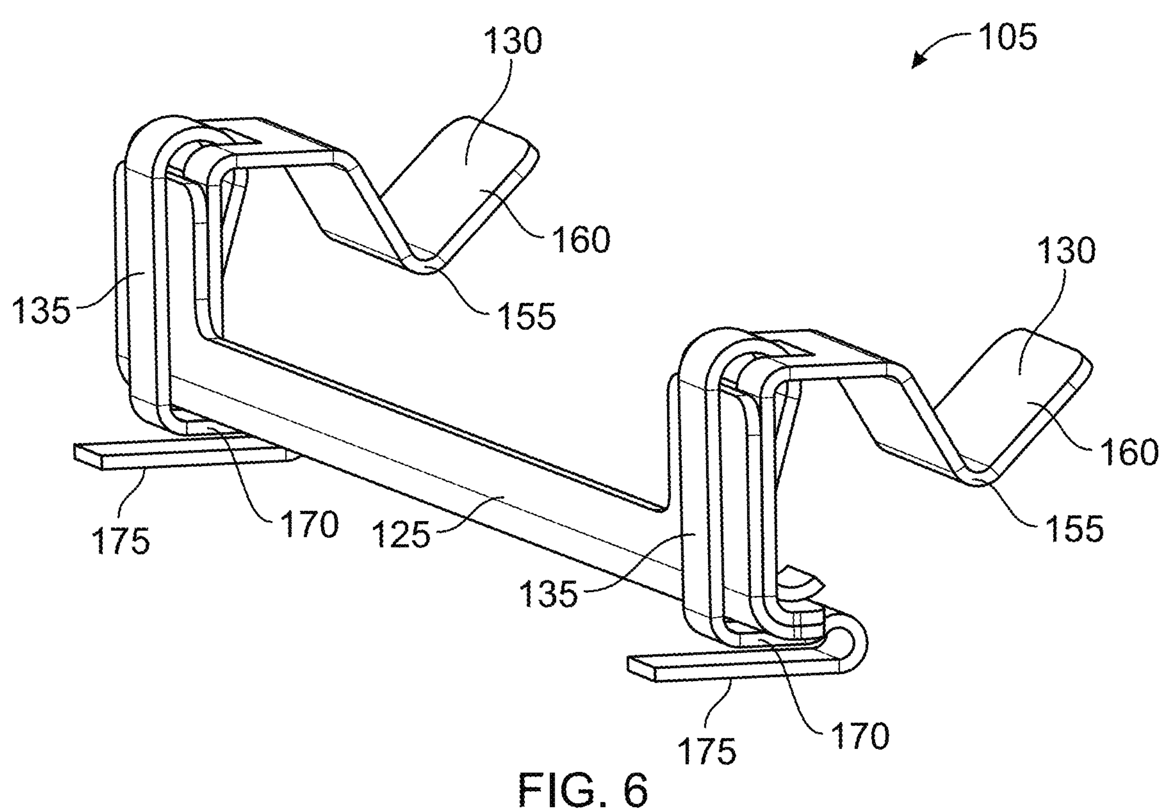
FIG. 6 is a perspective rear view of the clamp assembly according to an embodiment of the present invention.
Figure 7:
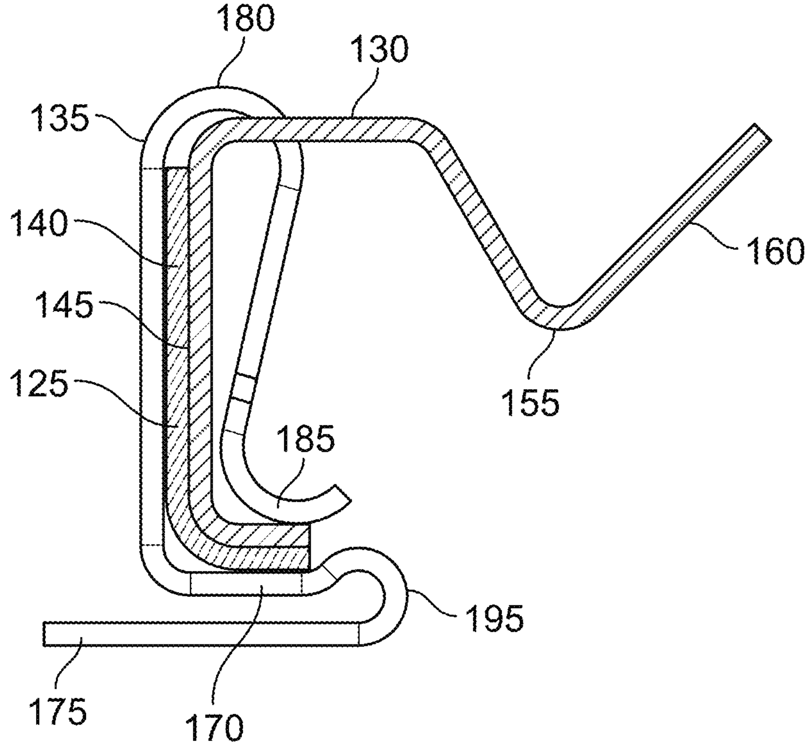
FIG. 7 is a cross-sectional view of the clamp assembly taken along line 7-7 in FIG. 4 showing the clamp in the closed position according to an embodiment of the present invention.

An extended shelf 110 is illustrated in FIGS. 3 & 5. The extended shelf can be made of any suitable material that is both heat resistant to temperature of about 125-250 degrees F., and has a low thermal conductivity. In one embodiment an extended shelf comprised of bamboo is utilized that is about 24" long, 18" wide and 0.63" thick, although sizes can vary substantially in other embodiments. In place of bamboo, many woods and ceramics can be used. Further, some embodiments are comprised of a polymeric composite material, such as a laminated paper and phenolic resin composite made by Richlite of Tacoma, Washington. Other composites include but are not limited to epoxy reinforced with fiberglass or carbon fiber.

Figure 9:
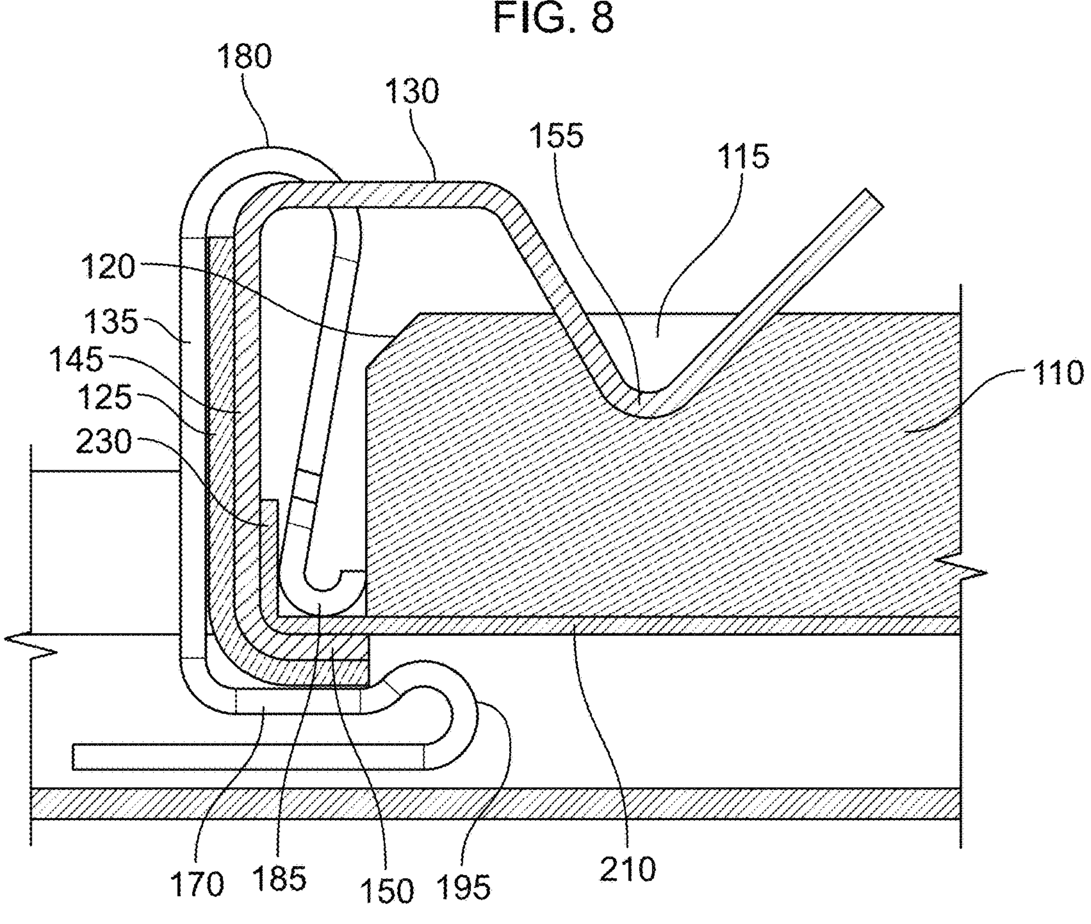
FIG. 9 is a cross-sectional view of the shelf extension assembly as installed on a griddle shelf taken along line 9-9 in FIG. 3 according to an embodiment of the present invention.

As shown, the top surface of the extended shelf 110 is characterized by a trough 115 that extends around the surface proximate the edges and perimeter thereof. The trough can receive the tips of the V-shaped portion of generally V-shaped arms 155 of the bracing clips 130 therein to more firmly secure the extended shelf to the underlying metal shelf 210. As can be seen in FIG. 9, the cross section of the trough can be generally V-shaped to correspond with the rear surfaces of the V-shaped arm to make removal of the extended shelf from the clip smoother and easier. Additionally, the perimeter edges 120 of the top surface of the extended shelf are beveled: The surface of the beveled edge interfaces with the forward surface of the V-shaped arm to make insertion of the extended shelf into the clip smoother and easier.

When removed from the griddle, the extended shelf 110 can be used as a serving platter and/or food prep station. In some variations of the shelf, handle cutouts or handle recesses 123 can be provided to make carrying the extended shelf to and from the griddle. In the illustrated variation, through holes 127 are provided proximate each of the corners. These holes are configured to receive corresponding tabs of silicone corner covers 133. The silicone covers are shown on two of the corners but in use all four corners would typically be covered. The covers provide a non-slip surface to help hold the shelf in place on another flat service, such as a table or countertop when being used as a serving tray or food prep surface.

Figure 10:
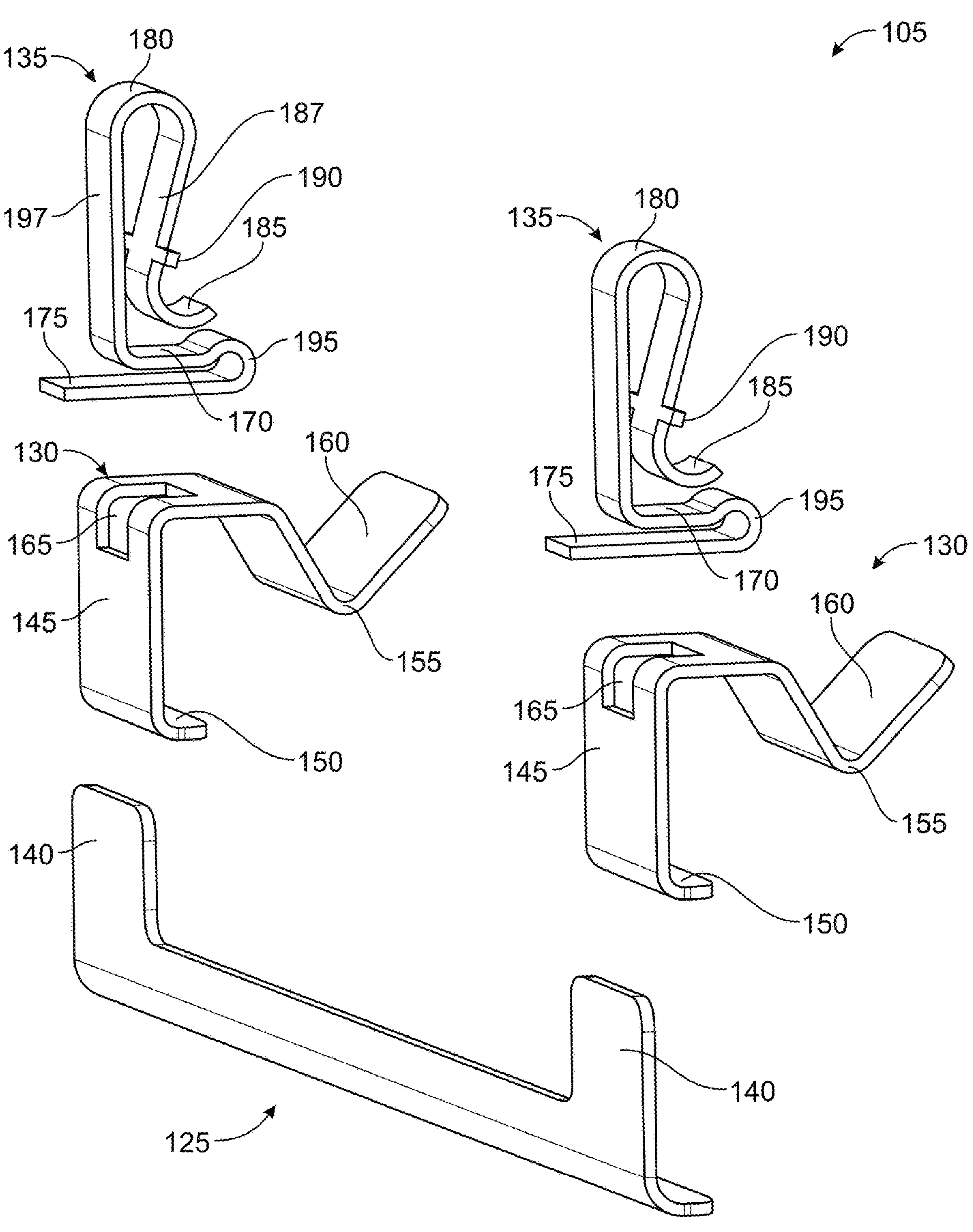
FIG. 10 is an exploded perspective view of the clamp assembly according to an embodiment of the present invention.

An assembled clip assembly 105 is illustrated in FIGS. 4 & 6-8, and an exploded view of the clip assembly is provided in FIG. 10. The clip assembly substantially comprises five components: one connector frame 125; two bracing clips 130; and two spring clips 135. The various pieces in one embodiment are comprised of stamped and formed sheet steel although variations made of other suitable materials are contemplated including versions made from heat resistant reinforced plastics.

The connector frame 125 acts to connect the two bracing clips 130 with one at either end of the connector frame. The vertical legs 145 of the bracing clips are attached to ends of the frame by any suitable means including adhesive joining, welding, and/or mechanical attachment. It is appreciated that variations of the clip assembly 105 are contemplated that comprise two separate clips without a connector frame; However, by joining two (or more) clips the use of the shelf extension assembly is improved as is adequate and desirable spacing of the clips along the metal shelf maintained for a more secure connection of the extended shelf.

The bracing clips 130 act to securely hold the extended shelf 110 in place against the underlying metal shelf 210 with the extended shelf's edge most proximate the griddle body 220 positioned close to the upwardly-turned flange 230 of the metal shelf. The bracing clips are typically generally C-shaped. At a bottom end, the clip comprises a bottom foot 150 that braces against the bottom surface of the metal shelf 210 proximate the upwardly extending flange as can be seen in FIG. 9. The top portion of the clip comprises a resilient V-shaped arm 155 configured to interface with the trough 115 of the extended shelf 110. The arm further includes an extended tab 160 that permits a user to flex the arm upwardly as necessary when inserting or removing the extended shelf from the clip assembly. The bottom foot and arm are coupled by way of the intervening generally vertical leg 145. It is typically along the surface of the leg that the bracing clip is secured to the connector frame. Further, a generally rectangular slot 165 extends through the clip spanning the intersection of the vertical leg and the V-shaped arm. The slot permits a portion of the spring clip 135 to pass therethrough.

Figure 8:
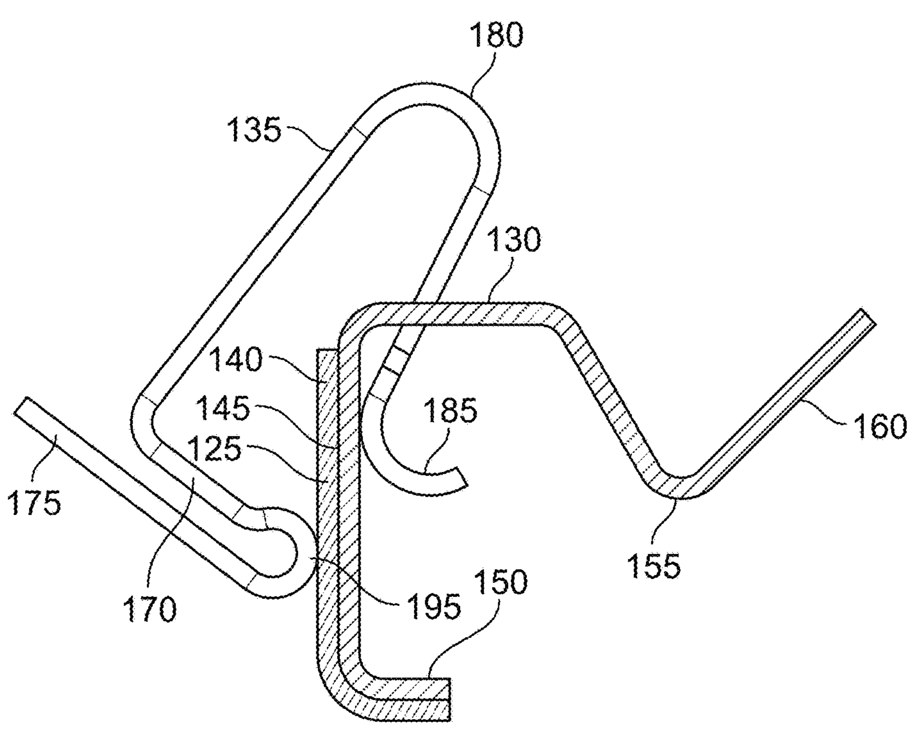
FIG. 8 is a cross-sectional view of the clamp assembly taken along line 7-7 in FIG. 4 showing the clamp in the open position according to an embodiment of the present invention.

The spring clips 135 act to hold the bracing clips 125 and the entire clip assembly 105 in place on the metal shelf 210 generally up against the upwardly extending flange 230 that borders the opening 225 between the body 215 of the griddle and the metal shelf. Effectively, the spring clip, when deployed, holds the clip assembly to the metal shelf while the extended shelf is being inserted or removed therefrom. FIGS. 4, 6, 7 & 9 show the spring clips in the deployed position; whereas FIG. 8 shows a spring clip in the undeployed position as would be used when installing or removing the clip assembly from the metal shelf as is described later.

The resilient spring clip 135 includes a spring clip tab 175 at the bottom end that a user can press a finger against either to install the clip assembly 105 on a metal shelf 210 or remove the clip assembly from the metal shelf. The tab is connected to the spring clip bottom foot 170 by way of a curved bend 195. The foot braces against the bottom of the connector frame 125 to help hold the clip assembly 105 securely against the bottom of the metal shelf. A spring clip leg 197 extends vertically from an intersection with the spring clip bottom foot interfacing with an upper curved bend 180 having a circumferential extent of about 210 degrees. The upper curved bend transitions into a downwardly and inwardly extending spring clip arm 187. The arm in turn transitions into an arcuate spring clip hand 185. As can best be seen in FIG. 9, when the spring clamp is deployed, the spring clamp hand presses both down against the horizontal top surface of the metal shelf and laterally against the upwardly-extending flange 230 forcing it against the vertical leg 145 of the bracing clip 130 thereby fixing the clip assembly in place on the metal shelf. The spring arm clip also includes an opposing pair of spring clip retaining tabs 190 that extend generally horizontally outwardly from the left and right edges thereof. The distance between the end of the left tab and the end of the right tab is greater than the width of the generally rectangular slot 165 of the bracing clip. The purpose of the retaining tabs being to prevent the spring clips 135 from separating from the rest of the clip assembly when the assembly is not installed.

a Method of Installing and Using of an Embodiment of the Heat-Resistant Shelf Extension Assembly on a Griddle's Metal Shelf To install the shelf extension assembly 100, the user first attaches the clip assembly 105 to the metal shelf 210. This comprises positioning the clip assembly against the long-flanged edge of the metal shelf's opening 225 with the spring clips in the undeployed position as shown in FIG. 8. The foot 150 of each bracing clip 130 is placed underneath the metal shelf and in contact with its bottom surface. Next, the user presses each spring clip 135 downwardly at their respective upper curved bend 180. This causes the spring clip hand 185 to slide over and in front of the flange 230 effectively securing the clip assembly in place. The curve of the spring clip hand 185 acts to guide it over the upwardly-extending flange.

Next, to install the extended shelf 110, the user rests the extended shelf on the surface of the metal shelf 210 with the extended shelf's desired edge in front of and parallel to the clip assembly 105. The user then pushes the shelf into the bracing clips until the V-shaped arms 155 are received in the trough 115 of the extended shelf to secure it in place.

The extended shelf 110 is then used in any manner desired by the user including, but not limited to, a food staging area for holding meat or other uncooked food prior to it being placed on the griddle, a receiving area for cooked food, a food preparation station, and a holding area for pans and cooking utensils. Although the extended shelf assembly 100 has been described singularly, it is to be appreciated that since many gas griddles and grills have two metal shelves, and accordingly, two extended shelf assemblies can be fitted to a grill, such that, for instance, one side can be used to hold uncooked food and the other side could be used to receive and hold cooked food.

As desired the user can remove the extended shelf 110 easily from the clip assembly 105, which typically remains attached to the metal shelf 210. The shelf can be removed by gently pulling it away from the clip assembly to be used as a serving tray and/or for cleaning. It is appreciated that the extended shelf, which in some embodiment including the bamboo embodiment described herein, can be used: (i) as a food-grade surface for the preparation of food to be cooked at a location remote from the grilled; (ii) to carry the pre-cooked prepared food to the grill whereat the shelf is secured in place on top of the smaller metal shelf; (iii) to receive cooked food; and (iv) to act as a serving tray for the cooked food. When not in use the extended shelf can be stored upright in a pantry, closet or cupboard until needed.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A shelf extension assembly for a gas grill or griddle having at least one metal shelf independently coupled to the gas grill or griddle, the shelf extension assembly comprising:

a non-metal extended shelf comprised of a material having a low thermal conductivity and being heat resistant to at least a temperature of about 125 degrees F.; and a clip assembly adapted for (i) fixedly and removably coupling to the at least one metal shelf, and (ii) removably securing the extended shelf to the at least one metal shelf;

wherein the clip assembly comprises (i) at least two bracing clips, the bracing clips configured to hold the extended shelf to the clip assembly and one of the at least one metal shelf, and (ii) at least two spring clips operatively coupled to the bracing clips and configured to secure the clip assembly to the at least one metal shelf;

wherein each of the bracing clips includes an opening therethrough through which a corresponding spring clip is received.

2. A combination comprising the shelf extension assembly of claim 1 and the gas grill or griddle.

3. The combination of claim 2, wherein the area of the extended shelf is at least 50% greater than the area of the at least one metal shelf.

4. The shelf extension assembly of claim 1, wherein the extended shelf comprises one of wood, ceramic, porcelain, a reinforced polymer, a polymer-based composite, and bamboo.

5. The shelf extension assembly of claim 1, wherein the extended shelf is bamboo.

6. The shelf extension assembly of claim 1, wherein the extended shelf is rectangular and includes four edges with a trough extending around a perimeter of a top surface proximate the edges.

7. The shelf extension assembly of claim 6, wherein the intersections between the top surface and the edges are beveled.

8. The shelf extension assembly of claim 1, wherein the bracing clips are generally C-shaped.

9. The shelf extension assembly of claim 6, wherein each of the bracing clips include a V-shaped arm with a tip of a V-shaped portion adapted for receipt into the trough extending around the top surface near the perimeter thereof.

10. The shelf extension assembly of claim 9, further including a connector frame coupled to and spacing apart the bracing clips.

11. The shelf extension assembly of claim 1, wherein the clip assembly is comprised substantially of sheet steel.

12. The shelf extension assembly of claim 1, wherein the bracing clips and the spring clips are comprised substantially of sheet steel.

13. The combination of claim 2, wherein the clip assembly is configured to remain attached to the one of the at least one metal shelf as the shelf extension is removed from the clip assembly and slid off of the at least one metal shelf and away from the grill/griddle.

14. A method of installing the shelf extension assembly of claim 1 on the at least one metal shelf, the method comprising:
placing the clip assembly over an edge of the at least one metal shelf;
attaching the clip assembly to the at least one metal shelf; and
sliding the extended shelf into the clip assembly until it clips in place.

15. A method of using the shelf extension assembly of claim 10, the method comprising:
with the spring clips in a undeployed first position, sliding open faces of the bracing clips on an edge of the at least one metal shelf;
while holding the clip assembly in place against the edge, moving the spring clips from the first position to a deployed second position;
placing the extended shelf at least partially on the at least one metal shelf; aligning an edge of the extended shelf with the open faces of the bracing clips; and
sliding the extended shelf into the bracing clips until the tips of the V-shaped portions are received into the trough.

16. A method of using the shelf extension assembly of claim 15, the method further comprising:
sliding the extended shelf outwardly from the bracing clips causing the V-shaped arms of the bracing clips to resiliently deform releasing the v-tip portion from the trough; and
removing the extended shelf off of the at least one metal shelf.

17. The method of using the shelf extension assembly of claim 16, the method further comprising:
storing the extended shelf remotely from the gas grill or griddle.

18. A shelf extension assembly for a gas grill or griddle having at least one metal side shelf, the shelf extension assembly comprising:
a non-metal extended shelf comprised of bamboo, wood or a paper and resin laminate being heat resistant to at least a temperature of about 125 degrees F., the extended shelf being rectangular and including four beveled edges with a trough extending around a perimeter of a top surface proximate the edges; and
a clip assembly adapted for (i) fixedly and removably coupling to the at least one metal shelf, and (ii) removably securing the extended shelf to the at least one metal shelf, the clip assembly including at least two bracing clips, the bracing clips configured to hold the extended shelf to the clip assembly and one of the at least one metal shelf, at least two spring clips operatively coupled to the bracing clips and configured to secure the clip assembly to the at least one metal shelf, and a connector frame coupled to and spacing apart the bracing clips;
wherein each of the bracing clips includes an opening therethrough through which a corresponding spring clip is received.

19. A shelf extension assembly for a gas grill or griddle having at least one metal shelf, the shelf extension assembly comprising:
a non-metal extended shelf comprised of a material having a low thermal conductivity and being heat resistant to at least a temperature of about 125 degrees F.; and
a clip assembly comprising (i) at least two bracing clips, (ii) at least two spring clips operatively coupled to the bracing clips, and (iii) a connector frame coupled to and spacing apart the at least two bracing clips;
the bracing clips (i) being configured to hold the extended shelf to the clip assembly and the at least one metal shelf, (ii) being configured to secure the clip assembly to the at least one metal shelf, (iii) being generally C-shaped, (iv) each including a V-shaped arm with a tip of a V-shaped portion adapted for receipt into a trough of the extended shelf, and (v) each including an opening therethrough through which a corresponding spring clip is received; and
the at least two spring clips configured to secure the clip assembly to the at least one metal shelf.

* * * * *